(12) United States Patent
Roffet et al.

(10) Patent No.: US 11,663,697 B2
(45) Date of Patent: May 30, 2023

(54) DEVICE FOR ASSEMBLING TWO SHOTS OF A SCENE AND ASSOCIATED METHOD

(71) Applicant: STMICROELECTRONICS (GRENOBLE 2) SAS, Grenoble (FR)

(72) Inventors: Gregory Roffet, Coublevie (FR); Stephane Drouard, Grenoble (FR); Roger Monteith, Edinburgh (GB)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 86 days.

(21) Appl. No.: 17/165,778

(22) Filed: Feb. 2, 2021

(65) Prior Publication Data

US 2021/0241423 A1 Aug. 5, 2021

(30) Foreign Application Priority Data

Feb. 3, 2020 (FR) ...................................... 2001049

(51) Int. Cl.
*G06T 3/40* (2006.01)
*G06T 7/00* (2017.01)
*G01S 17/894* (2020.01)

(52) U.S. Cl.
CPC .......... *G06T 3/4038* (2013.01); *G01S 17/894* (2020.01); *G06T 7/97* (2017.01); *G06T 2200/32* (2013.01); *G06T 2207/10016* (2013.01)

(58) Field of Classification Search
None
See application file for complete search history.

(56) References Cited

U.S. PATENT DOCUMENTS 10,491,877 B1 * 11/2019 Hall .................... H04N 13/128
11,236,993 B1 * 2/2022 Hall .................... G02B 27/017
11,520,021 B2 * 12/2022 Kubota ................ G01S 7/4816
(Continued)

FOREIGN PATENT DOCUMENTS

EP 2 261 853 A1 12/2010
EP 2 854 103 A1 4/2015
(Continued)

OTHER PUBLICATIONS

Conde, Miguel Heredia, Klaus Hartmann, and Otmar Loffeld. "Adaptive high dynamic range for time-of-flight cameras." IEEE Transactions on Instrumentation and Measurement 64.7 (2014): 1885-1906. (Year: 2014).*

(Continued)

*Primary Examiner* — Michelle M Entezari
(74) *Attorney, Agent, or Firm* — Seed Intellectual Property Law Group LLP

(57) ABSTRACT

A device for assembling at least two shots of a scene acquired by at least one sensor includes a memory and processing circuitry. The processing circuitry is configured to save, in the memory, a first data set contained in a first signal generated by each pixel of the sensor and indicative of a first shot of the scene, and a second data set contained in a second signal generated by each pixel of the sensor and indicative of a second shot of the scene. The processing circuitry is further configured to assemble the first and second shots on the basis of the content of the first and second data sets of a plurality of pixels in order to form a resulting scene.

20 Claims, 5 Drawing Sheets

(56) References Cited

U.S. PATENT DOCUMENTS

| | | | |
|---|---|---|---|
| 2008/0143840 A1* | 6/2008 | Corkum | H04N 5/23277 348/208.99 |
| 2017/0289515 A1* | 10/2017 | Li | H04N 13/122 |
| 2019/0293764 A1* | 9/2019 | Van Nieuwenhove | H01L 27/14643 |
| 2020/0158876 A1* | 5/2020 | Karadeniz | G05D 1/0088 |

FOREIGN PATENT DOCUMENTS

| | | |
|---|---|---|
| GB | 2569656 A | 6/2019 |
| WO | 2019/077010 A1 | 4/2019 |

OTHER PUBLICATIONS

Uno, Kentaro, et al. "Qualification of a Time-of-Flight Camera as a Hazard Detection and Avoidance Sensor for a Moon Exploration Microrover." Transactions of The Japan Society for Aeronautical and Space Sciences, Aerospace Technology Japan 16.7 (2018): 619-627. (Year: 2018).*

Hafiane, Mohamed Lamine, et al. "Depth resolution enhancement technique for CMOS time-of-flight 3-D image sensors." IEEE Sensors Journal 12.6 (2012): 2320-2327. (Year: 2012).*

Burt et al., "Enhanced Image Capture Through Fusion," (4th) International Conference on Computer Vision, Berlin, Germany, May 11-14, 1993, pp. 173-182.

Garcia et al., "A New Multi-lateral Filter for Real-Time Depth Enhancement," 8th IEEE International Conference on Advanced Video and Signal-Based Surveillance, Klagenfurt, Austria, Aug. 30-Sep. 2, 2011, pp. 42-47.

* cited by examiner

*FIG. 3*
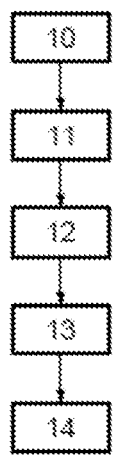
*FIG. 4*
| C1 | C2 | C3 | C4 |
|---|---|---|---|
| X31 | Y31 | DATA1 | DATA10 |
| ⋮ | ⋮ | ⋮ | ⋮ |
| X39 | Y39 | DATA9 | DATA18 |
*FIG. 5*
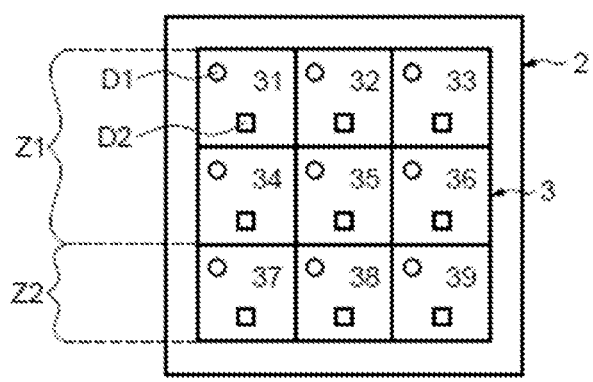

DEVICE FOR ASSEMBLING TWO SHOTS OF A SCENE AND ASSOCIATED METHOD

BACKGROUND

Technical Field

Embodiments of the disclosure relate to assembling scenes acquired by a sensor, in particular by a sensor of the photodiode type or of the time-of-flight type measuring three-dimensional scenes.

Description of the Related Art

In order to improve the acquisition quality of a scene, for example, an image, an image sensor generally takes two shots of the image, with each shot having different exposure times in order to generate, for example, a high dynamic resulting image.

A first shot is acquired during a first "short" exposure time in order to acquire light information located in the brighter zones of the image, and a second shot is acquired during a second "long" exposure time, longer than the first time, in order to acquire light information located in darker zones of the image.

The two shots are processed by an image processing algorithm to generate a resulting image on the basis of the two shots.

Generally, the image processing algorithm generates the resulting image on the basis of a weighted combination of the two shots, with the weighting coefficients being linearly determined according to the exposure time of each shot.

The sensor can comprise a matrix of pixels, with each pixel containing a first photodiode for acquiring the first shot and a second photodiode for acquiring the second shot, the shots are acquired simultaneously.

According to another embodiment, the sensor can comprise a single photodiode, with the first and second shots being acquired separately.

However, the response of the photodiodes is not linear, such that the quality of the resulting image is degraded.

The response of the photodiodes is degraded, in particular by dimensional variations of the photodiodes caused by the methods for manufacturing photodiodes, the position of the photodiodes in the matrix of pixels, the temperature variations between the pixels and the color distortions.

When the shots are acquired sequentially, in particular by a sensor of the time-of-flight type, the response of the sensor may be non-linear, such that the quality of the resulting image is degraded, in particular due to temperature variations between the pixels of the time-of-flight sensor.

Furthermore, for a time-of-flight sensor, the intensity of the signal transmitted by a transmission device, for example, a laser ("Light Amplification by Stimulated Emission of Radiation") of said sensor, can be different for each shot, in particular when the transmission device operates in a transition zone, generating shots with different intensities.

The intensity variations of the shots generate non-linear pixel signals.

BRIEF SUMMARY

In various embodiments of the present disclosure, systems, devices, and methods are provided which improve the assembly of two shots acquired by a sensor for generating a resulting image.

According to embodiments, assembling different shots of the same scene acquired by pixels while determining a weighted combination of the data generated by the pixels on the basis of the shots is advantageously proposed, the weighting coefficients being determined on the basis of the content of the data themselves.

According to one aspect, a method is proposed for assembling at least two shots of a scene acquired by at least one sensor comprising:

acquiring a first shot of the scene by the sensor, the acquisition of the first shot being performed during a first acquisition time;

acquiring a second shot of the scene by the sensor, the acquisition of the second shot being performed during a second acquisition time longer than the first acquisition time;

assembling the first and second shots so as to form a resulting scene, the contribution of the first and second shots in the resulting scene being determined on the basis of the content of the first and second shots.

Unlike the conventional approaches, in which the shots are assembled by taking into account their respective exposure time, the contribution of each of the first and second shots in the resulting scene is determined according to the content of the first and second shots.

The quality of the resulting scene is improved by particularly taking into account the noisy signals containing the data of the shots, the dimensional variations of the sensor resulting from the method for manufacturing said sensor, and the environment in which the sensor operates, such as the temperature.

According to one embodiment, the sequential acquisition of the first and second shots comprises converting a light signal received on each pixel of the sensor of the time-of-flight type into a first signal containing a first data set indicative of the first shot of the scene, saving, in a memory, first data sets and the position of the pixels in the sensor, the pixels not being located in a zone of light saturation of the pixels and having a signal-to-noise ratio that is above a threshold or for which the first data sets are within a predetermined confidence interval, with the pixels for which the first data sets are saved forming a first set of pixels, converting a light signal received on each pixel of the sensor of the time-of-flight type into a second signal containing a second data set indicative of the second shot of the scene, and saving second data sets of the pixels of the first set in the memory.

The method is configured to process data generated by the time-of-flight sensor.

According to yet another embodiment, assembling the first and second shots of the scene comprises, for at least the first set of pixels of the sensor, determining an assembly coefficient by weighting and averaging the first and second data sets of the pixels of the first set, determining a first corrected data set by multiplying the first data set of each pixel of the sensor by the assembly coefficient and adding the first corrected data set and the second corrected data set in order to obtain the resulting scene.

The dynamic determination of the assembly coefficient allows real-time adjustment of the shots of the same scene so that they are at the same brightness level, while taking into account the noise level of the signals transmitted by the sensor, so as to improve the quality and the representation of the scene resulting from assembling the different shots.

According to yet another embodiment, acquiring the first shot of the scene is performed by a first photodiode of each pixel of the sensor and acquiring the second shot of the scene is performed by a second photodiode of each pixel of the sensor, the simultaneous acquisition of the first and second shots comprising converting a light signal received by the first photodiode of the pixels into a first signal comprising a first data set and converting a light signal received by the second photodiode of the pixels into a second signal comprising a second data set, saving, in a memory, the first and second data sets of the pixels that are not located in a zone of light saturation of the pixels and that have a signal-to-noise ratio that is above a threshold or for which the first data set is within a predetermined confidence interval, with said pixel/the pixels for which the first and second data sets are saved forming a first set.

The method is configured to process data generated by a conventional photodiode sensor having non-linearities.

According to yet another embodiment, assembling the first and second shots of the scenes comprises determining, for at least the first set of pixels, an assembly coefficient by weighting and averaging the first and second data sets of the pixels of the second set, determining a first corrected data set by multiplying the first data set of each pixel of the sensor by the assembly coefficient and adding the first corrected data set and the second data set in order to obtain the resulting scene, the data generated by each pixel of the second set having a signal-to-noise ratio that is above a threshold, said pixel not being in a zone of light saturation.

The dynamic determination of the assembly coefficient allows real-time adjustment of the shots of the same scene so that they are at the same brightness level, while taking into account the noise level of the signals transmitted by the sensor, so as to improve the quality and the representation of the scene resulting from assembling the various shots.

According to yet another embodiment, the first set comprises all the pixels of the sensors.

According to yet another embodiment, the first set comprises at least one first zone of pixels of the sensor containing a number of pixels that is less than or equal to the total number of pixels of the sensor.

The quality of the resulting scene is improved in the first zone, allowing optimization of the processing times for implementing the method, with the first zone corresponding, for example, to part of the scene comprising the greatest detail.

According to yet another embodiment, the first set comprises at least one second zone of pixels containing a number of pixels that is less than or equal to the total number of pixels of the sensor, the method comprising repeating the determination of the assembly coefficient for the second zone, the resulting scene being obtained by assembling the first corrected data sets and the second data sets of the first and second zones.

Different zones of the shots of the same scene having different texture characteristics, details or colors are processed independently of one another in order to improve the quality of the resulting scene.

According to yet another embodiment, the assembly coefficient is determined for at least one second set of pixels of the sensor, said pixels not being located in a zone of light saturation of the pixels and having a higher signal-to-noise ratio ranging between a second and a third threshold or for which the first data sets are within a second predetermined confidence interval.

According to yet another embodiment, the assembly coefficient is determined for each pixel of the sensor.

According to another aspect, a device is proposed for assembling at least two shots of a scene acquired by at least one sensor comprising:

a memory;

a processing unit configured to save, in the memory, a first data set contained in a first signal generated by each pixel of the sensor and indicative of a first shot of the scene acquired by the sensor during a first acquisition time, and a second data set contained in a second signal generated by each pixel of the sensor and indicative of a second shot of the scene acquired by the sensor during a second acquisition time longer than the first acquisition time;

the processing unit also being configured to assemble the first and second shots on the basis of the content of the first and second data sets of a plurality of pixels in order to form a resulting scene.

According to one embodiment, when the sensor is of the time-of-flight type, the processing unit is configured to:

determine a first set of pixels comprising a plurality of pixels that are not in a zone of light saturation of the pixels and that each generate a first data signal having a signal-to-noise ratio above a threshold or for which the first data set is within a predetermined confidence interval;

save the first data set of each pixel of the first set of pixels in the memory so that the first data set of each pixel of the time-of-flight sensor is addressed according to the position of the pixel in the sensor;

save the second data set of each pixel of the first set of pixels addressed according to the position of the pixel in the sensor;

determine an assembly coefficient by weighting and averaging the first and second data sets of the pixels of the first set;

determine a first corrected data set by multiplying the first data set by the assembly coefficient; and add the first corrected data set and the second data set in order to obtain the resulting scene.

According to another embodiment, when each pixel of the sensor comprises a first photodiode and a second photodiode, the processing unit is configured to:

save the first and second data sets in the memory for which a signal-to-noise ratio of the first signal of each pixel is above a threshold or for which the first data set of said pixel is within a confidence interval, said pixel not being located in a zone of light saturation of the pixel;

determine an assembly coefficient by weighting and averaging the first and second data sets of the pixels of the first set;

determine a first corrected data set by multiplying the first data set by the assembly coefficient; and add the first corrected data set and the second data set in order to obtain the resulting scene.

According to yet another embodiment, the first set comprises all the pixels of the sensor.

According to yet another embodiment, the first set comprises at least one first zone of pixels of the sensor containing a number of pixels that is less than or equal to the total number of pixels of the sensor.

According to yet another embodiment, the first set comprises at least one second zone of pixels containing a number of pixels that is less than or equal to the total number of pixels of the sensor, the method comprising repeating the determination of the assembly coefficient for the second zone, the resulting scene being obtained by assembling the first corrected data sets and the second data sets of the first and second zones.

According to yet another embodiment, the processing unit is configured to compute the assembly coefficient for at least one second set of pixels of the sensor, said pixels not being located in a zone of light saturation of the pixels and having a higher signal-to-noise ratio ranging between a second and a third threshold or for which the first data sets are within a second predetermined confidence interval.

According to yet another embodiment, the processing unit is configured to compute the assembly coefficient for each pixel of the sensor.

According to yet another aspect, a system is proposed for assembling at least two scenes acquired by at least one sensor comprising a device as previously defined and at least one sensor connected to said device.

BRIEF DESCRIPTION OF THE SEVERAL VIEWS OF THE DRAWINGS

Further advantages and features of the disclosure will become apparent with reference to the detailed description of embodiments, which are by no means limiting, and to the accompanying drawings, in which:

FIG. 3 shows an embodiment of the device connected to the sensor of the time-of-flight type.

FIG. 4 shows an example of addressing of the memory.

FIG. 5 shows an embodiment of the matrix of the sensor of the "photodiode" type.

DETAILED DESCRIPTION

Figure 1:
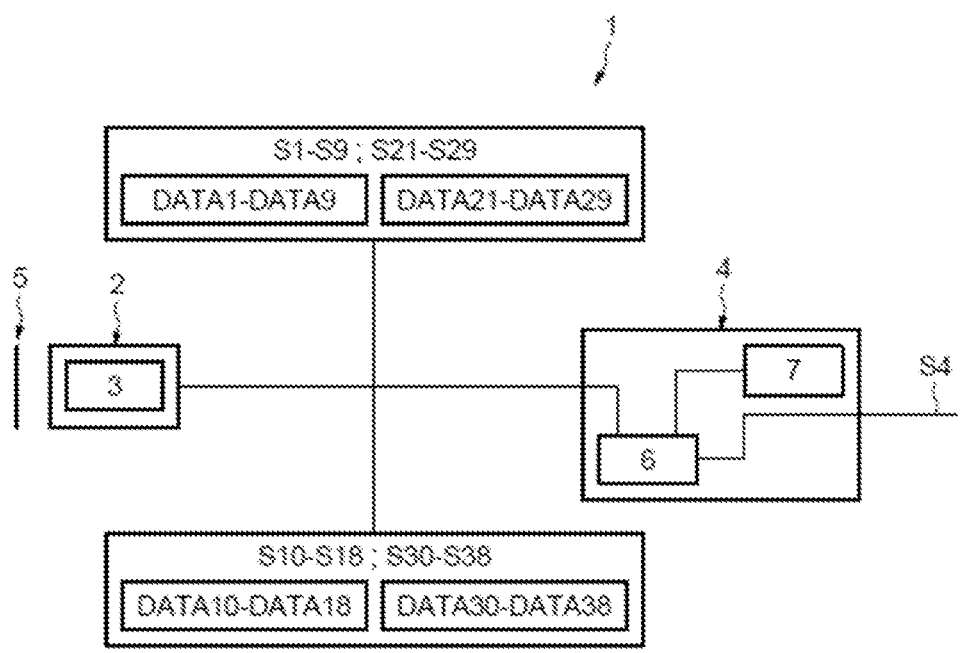
FIG. 1 represents an embodiment of a system for assembling two scenes comprising a sensor containing a matrix of pixels, and a device for assembling two scenes acquired by the sensor.

Reference will be made to FIG. 1, which represents an embodiment of a system 1 for assembling two scenes comprising a sensor 2 containing a matrix of pixels 3, and a device 4 for assembling two scenes acquired by the sensor 2.

The sensor 2 acquires a first shot SH1 of a scene 5 during a first acquisition time T1 and a second shot SH2 of the scene 5 during a second acquisition time T2 longer than the first acquisition time T1.

Each pixel of the matrix of pixels 3 delivers a first signal Si containing a first data set DATA1 indicative of the first shot SH1 of the scene 5 acquired during the first acquisition time T1, and a second data set DATA2 contained in a second signal S10 indicative of the second shot SH2 of the scene 5 acquired by the sensor during the second time T2.

The pixels of the matrix 3 convert light signals into first and second data sets DATA1 and DATA2.

The first shot SH1 acquired during the first "short" exposure time T1 allows the light information located in the brighter zones of the scene 5 to be acquired, and the second shot SH2 acquired during the second "long" exposure time T2 allows the light information located in the darker zones of the scene 5 to be acquired.

The device 4 is configured to assemble the first and second shots SH1, SH2 so as to form the resulting scene, with the contribution of the first and second shots in the resulting scene being determined on the basis of the content of the first and second shots.

The assembly device 4 generates a signal S4 indicative of the resulting scene on the basis of the first and second signals Si, S10.

The assembly device 4 comprises processing circuitry 6 (which may be referred to herein as a processing unit 6) and a memory 7 connected to the processing unit 6.

The processing unit 6 is configured to process and save, in the memory 7, the first data set DATA1 contained in the first signal Si generated by each pixel of the matrix 3, and the second data set DATA2 contained in the second signal S10 generated by each pixel of the matrix 3. The processing unit 6 may include any electrical circuitry configured to perform the various operations described herein with respect to the processing unit 6. In some embodiments, the processing unit 6 may include one or more programmed computer processors, microcontrollers, or the like configured to perform the operations described herein with respect to the processing unit 6.

The processing unit 6 is also configured to assemble the first and second shots SH1, SH2 on the basis of the content of the first and second data sets DATA1, DATA2 of a plurality of pixels of the matrix 3 in order to form the resulting scene, and deliver the signal S4.

Figure 2:
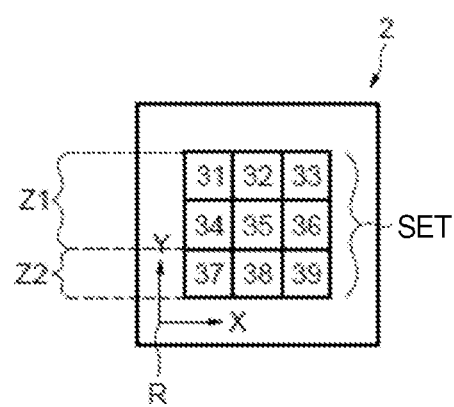
FIG. 2 shows an embodiment of the matrix of the sensor of the time-of-flight type.

FIG. 2 shows an embodiment of the matrix 3 of the sensor 2 of the time-of-flight type.

The matrix 3 comprises nine pixels numbered 31 to 39, with pixel number 35 being disposed at the center of the matrix 3.

Of course, the matrix 3 can comprise more or less than nine pixels.

Each pixel numbered 31 to 39 generates the first signal Si to S9 containing the first data set DATA1 to DATA9, and the second signal S10 to S18 containing the second data set DATA10 to DATA18.

Each first data set DATA1 to DATA9 and each second data set DATA10 to DATA18 can comprise a single item of information generated by the pixels numbered 31 to 39 or a combination of several items of information generated by the pixels numbered 31 to 32 during the first and second shots.

The first and second shots SH1, SH2 are acquired sequentially so that the device 4 receives the data DATA1 to DATA9, then the data DATA10 to DATA18.

The position of each pixel numbered 31 to 39 in the matrix 3 is identified, for example, relative to a reference R comprising an abscissa axis X and an ordinate axis Y, so that each pixel numbered 31 to 39 is referenced in the reference R by its coordinates X31 to X39 and Y31 to Y39.

FIG. 3 shows an embodiment of the device 4 connected to the sensor 2 of the time-of-flight type.

It is assumed that the processing unit 6 firstly receives the first signals Si to S9 containing the data DATA1 to DATA9, then the second signals S10 to S18 containing the data DATA10 to DATA18.

As an alternative embodiment, the processing unit 6 could firstly receive the signals S10 to S18, then the signals Si to S9.

During a step 10, the processing unit 6 determines, as they are received, a signal-to-noise ratio for each signal Si to S9.

The processing unit 6 saves, in the memory 7, the data DATA1 to DATA9 and the position of the pixels (coordinates X30 to X39 and Y30 to Y39) in the sensor 2 of the pixels numbered 31 to 39 having a signal-to-noise ratio above a threshold THR or for which the first data sets DATA1 to DATA9 are within a predetermined confidence interval and are not located in a zone of light saturation of the pixels.

The processing unit 6 determines whether a pixel of the matrix 3 is not in a zone of light saturation by comparing the amplitude of the first signal with a saturation threshold SAT, said pixel not being in a saturation zone if the amplitude is below the threshold SAT.

The pixels for which the data sets are saved form a first set SET of pixels.

The first set SET comprises all the pixels numbered 31 to 39 of the sensor 2.

Then, during a step 11 (FIG. 3), the processing unit 6 saves, in the memory 7, the second data sets DATA10 to DATA18 generated by the pixels of the first set SET.

FIG. 4 shows an example of addressing of the memory 7.

The memory 7 is addressed in, for example, a first column and a second column C1 and C2 respectively containing the abscissas X30 to X39 and the ordinates Y30 to Y39 of pixels numbered 30 to 39 in the reference R, and third and fourth columns C3 and C4 respectively containing the first and second data sets DATA1 to DATA9 and DATA10 to DATA18 associated with the coordinates of the pixel that generated said first and second data sets.

During a step 12, the processing unit 6 dynamically determines an assembly coefficient COEFF by weighting and averaging the first and second data sets DATAj of the pixels j of the first set SET.

$$COEFF = \frac{\sum_{j}^{SET} DATAj}{Nb}, \quad (1)$$

where Nb is the number of pixels contained in the first set SET.

In a step 13, the processing unit 6 determines a first corrected data set DATACj for each pixel j of the first set by multiplying the first data set DATAj of the pixels j of the first set SET by the assembly coefficient COEFF, so that:

$$DATAC_j = COEFF \cdot DATA_j \quad (2)$$

The first corrected data set DATACj is at the same brightness level as the second data set so as to correct the effects of non-linearities of the pixels numbered 31 to 39 of the first set SET comprising the pixels of the matrix 3.

Then, during a step 14, the processing unit adds the first corrected data set DATACj and the second data set DATAj for each pixel j of the first set SET in order to obtain the resulting scene.

The device 4 allows data generated by the time-of-flight sensor 2 to be processed.

As an alternative embodiment, the first set SET can comprise a first zone Z1 of pixels of the sensor containing a number of pixels that is less than or equal to the total number of pixels of the sensor.

The quality of the resulting scene is improved in the first zone, allowing optimization of the processing times of the device 4, with the first zone corresponding, for example, to part of the scene 5 comprising the greatest detail.

The first set can further comprise a second zone Z2 of pixels containing a number of pixels that is less than or equal to the total number of pixels of the sensor 2, with the previously described steps being repeated to determine an assembly coefficient of the second zone. The resulting scene is obtained by assembling the first corrected data sets and the second data sets of the first and second zones.

The first zone Z1 of pixels can comprise pixels located in a predetermined part of the matrix, for example, the pixels located in the two first rows of the matrix 3 with a signal-to-noise ratio that is above a threshold THR1 or for which the first data sets DATA1 to DATA9 are within a predetermined confidence interval and are not located in a zone of light saturation of the pixels, and the zone Z2 of pixels can comprise pixels located in the third row of the matrix 3 having a signal-to-noise ratio above a threshold THR2 or for which the first data sets DATA1 to DATA9 are within a predetermined confidence interval and are not located in a zone of light saturation of the pixels.

Of course, zones Z1 and Z2 can be delimited in a different manner.

Different zones of the shots of the same scene having different texture characteristics, details or colors are processed independently of one another to improve the quality of the resulting scene.

Of course, the first set can comprise more than two zones.

FIG. 5 shows an embodiment of the matrix 3 of the sensor 2 of the "photodiode" type.

The matrix 3 comprises the nine pixels numbered 31 to 39, with pixel number 35 being disposed at the center of the matrix 3.

The pixels generate the first signal S21 to S29 containing the first data set DATA21 to DATA29, and the second signal S30 to S38 containing the second data set DATA30 to DATA38.

Each pixel numbered 31 to 39 comprises a first photodiode D1 and a second photodiode D2.

The first photodiode D1 of each pixel numbered 31 to 39 generates, on the basis of a light signal of the scene 5, the first signal S21 to S29 comprising the first data set DATA21 to DATA29, and the second photodiode D2 of each pixel numbered 31 to 39 generates, on the basis of a light signal of the same scene 5, the second signal S30 to S38 comprising the second data set DATA30 to DATA38.

The first and second shots SH1 and SH2 are triggered simultaneously so that the signals S21 to S38 are generated simultaneously or practically simultaneously.

Figure 6:
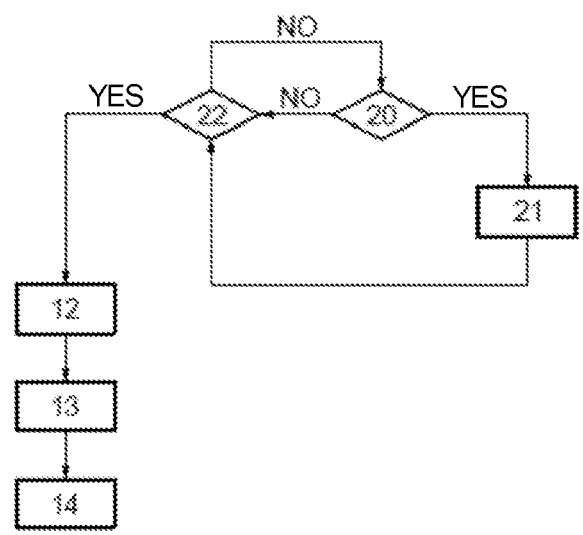
FIG. 6 shows an embodiment of the device connected to the sensor of the "photodiode" type.

FIG. 6 shows an embodiment of the device 4 connected to the sensor 2 of the "photodiode" type.

It has been assumed that the processing unit 6 simultaneously receives the first signals S21 to S29 containing the first data sets DATA21 to DATA29 and the second signals S30 to S38 containing the second data sets DATA30 to DATA38.

During step 20, the processing unit 6 determines, for each pixel of the sensor 3, whether the first signal of said pixel has a signal-to-noise ratio above the threshold THR or whether the first data set of said pixel is within a predetermined confidence interval, said pixel not being located in a zone of light saturation of the pixels.

If the first signal of said pixel has a signal-to-noise ratio above the threshold THR or the first data set is within the predetermined confidence interval, with the pixel not being located in the zone of light saturation of the pixels (step 21), the processing unit 6 saves the first and second data sets of said pixel in the memory 7.

The pixels for which the first and second data sets are saved form the first set SET. If all the pixels of the first set have not been processed by the processing unit 6, step 20 (step 22) is started.

If said pixel has a signal-to-noise ratio below the threshold THR and the first data set is not within the predetermined confidence interval or the pixel is located in the zone of light saturation of the pixels (step 21), step 20 (step 22) is started.

If all the pixels of the first set have been processed by the processing unit 6, then the previously described steps 11, 12, 13 and 14 are started.

Figure 7:
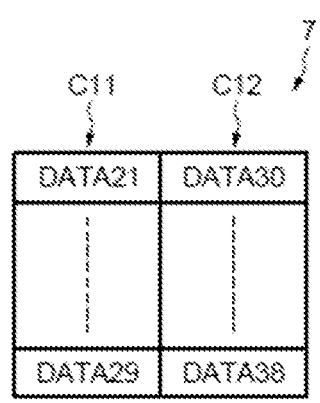
FIG. 7 shows an example of addressing of the memory.

FIG. 7 shows an example of addressing of the memory 7.

The memory 7 is, for example, addressed in a first column C11 and in a second column C12 respectively containing the first and second data sets DATA21 to DATA29 and DATA30 to DATA38.

The dynamic determination of the assembly coefficient allows real-time adjustment of the shots of the same scene, so that they are at the same brightness level while taking into account the noise level of the signals transmitted by the sensor, so as to improve the quality and the representation of the scene resulting from assembling the different shots.

Figure 8:
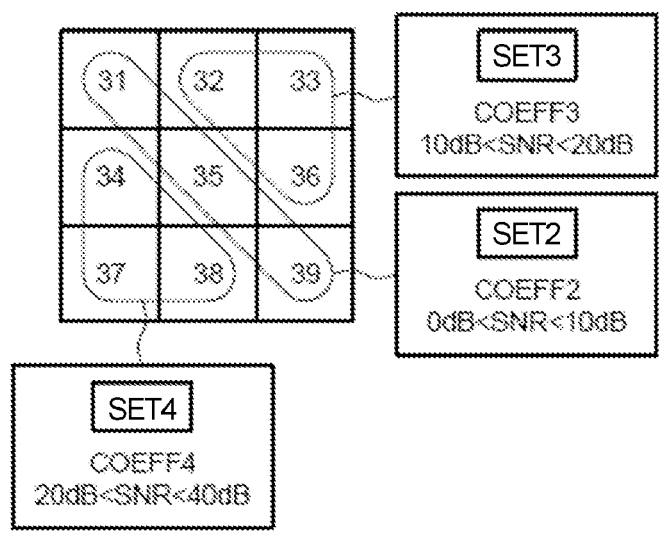
FIG. 8 shows another embodiment for sensors of the time-of-flight or photodiode type.

According to another embodiment for sensors of the time-of-flight or photodiode type, the assembly coefficient is determined for several sets SET2, SET3 and SET4 of pixels of the sensor (FIG. 8), with each set SET2, SET3 and SET4 of pixels being defined by intervals of values of a signal-to-noise ratio ranging between a second and a third threshold or predetermined confidence interval values, so that the pixels numbered 31 to 39 each belong to only one of the sets SET2, SET3 and SET4, with said pixels not being located in a zone of light saturation of the pixels.

For example, the second set SET2 comprises the pixels numbered 31, 35, 39 comprising a first signal, the signal-to-noise ratio SNR of which is between 0 db and 10 db, the third set SET3 comprises the pixels numbered 32, 33, 36 comprising a first signal, the signal-to-noise ratio SNR of which is between 10 db and 20 db, and the fourth set SET4 comprises the pixels numbered 34, 37, 38 comprising a first signal, the signal-to-noise ratio SNR of which is between 20 db and 40 db.

A second assembly coefficient COEFF2 is determined as previously described on the basis of the second set SET2, a third assembly coefficient COEFF3 is determined as previously described on the basis of the third set SET3, and a fourth assembly coefficient COEFF4 is determined as previously described on the basis of the fourth set SET4.

The processing unit 6 is also configured to compute the assembly coefficients COEFF2, COEFF3 and COEFF4.

Determining an assembly coefficient for several sets allows the quality of the resulting scene to be refined by locally computing an assembly coefficient.

Figure 9:
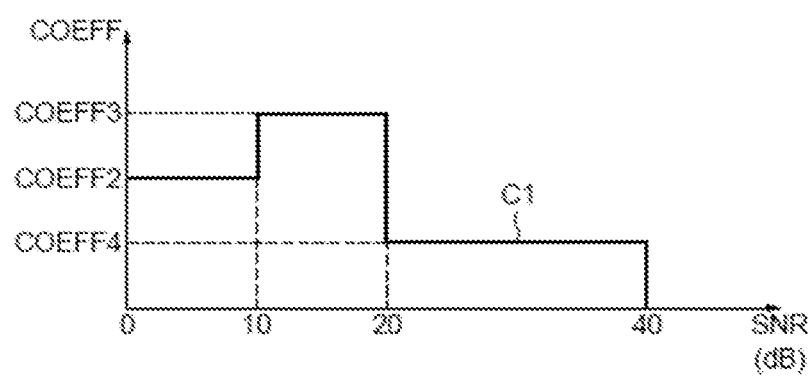
FIG. 9 shows a curve associating the value of the assembly coefficient with the value of the signal-to-noise ratio for the sets.

FIG. 9 shows a curve C1 associating the value of the assembly coefficient COEFF with the value of the signal-to-noise ratio SNR for the sets SET2, SET3 and SET4.

Of course, the pixels of the sensor contained in the same set may not be adjacent.

Furthermore, the matrix of pixels of the sensor can be divided into approximately three sets SET2, SET3 and SET4.

According to yet another embodiment, an assembly coefficient is determined for each of the pixels numbered 31 to 39, with the processing unit 6 also being configured to compute the assembly coefficient of each pixel numbered 31 to 39.

Figure 10:
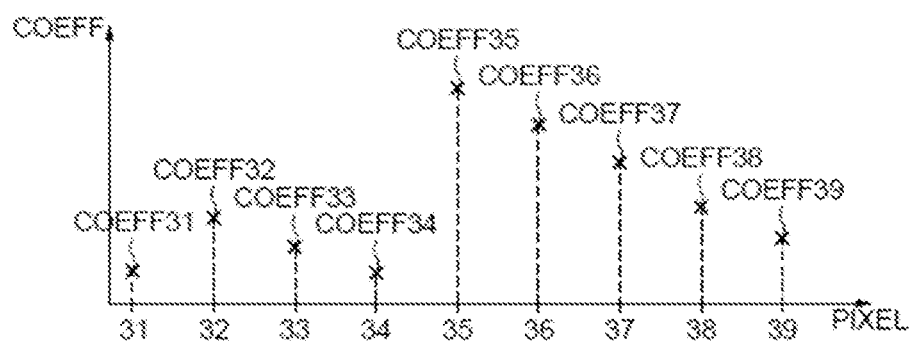
FIG. 10 shows the value of the coefficient or each pixel.

FIG. 10 shows the value of the coefficient COEFF for each pixel numbered 31 to 39.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for assembling at least two shots of a scene acquired by a time-of-flight sensor, comprising:
   acquiring a first shot of the scene by the time-of-flight sensor during a first acquisition time by converting a light signal from each pixel of the time-of-flight sensor into a first signal containing a first data set indicative of the first shot of the scene;
   saving, in a memory, the first data set and positions of pixels in the time-of-flight sensor the pixels not being located in a zone of light saturation of the pixels and the pixels having a signal-to-noise ratio that is above a threshold signal-to-noise ratio;
   acquiring a second shot of the scene by the time-of-flight sensor during a second acquisition time that is longer than the first acquisition time; and
   forming a resulting scene by assembling the first and second shots, a contribution of the first and second shots in the resulting scene being in response to at least the first data set and the positions of the pixels from the memory.

2. The method according to claim 1, wherein the acquisition of the first and second shots is sequential and includes:
   saving, in the memory, a first set of pixels comprising data of the first data set that is within a predetermined confidence interval and positions of pixels in the time-of-flight sensor;
   converting a light signal received on each pixel of the time-of-flight sensor into a second signal containing a second data set indicative of the second shot of the scene; and
   saving in the memory data of the second data set generated by the pixels of the first set.

3. The method according to claim 2, wherein assembling the first and second shots includes, for at least the first set of pixels of the time-of-flight sensor:
   determining an assembly coefficient by weighting and averaging the first and second data sets of the pixels of the first set;
   determining a first corrected data set by multiplying the first data set of each pixel of the time-of-flight sensor by the assembly coefficient; and
   adding the first corrected data set and a second corrected data set to obtain the resulting scene.

4. The method according to claim 3, wherein the first set of pixels comprises all the pixels of the time-of-flight sensor.

5. The method according to claim 3, wherein the first set of pixels comprises at least one first zone of pixels of the time-of-flight sensor containing a number of pixels that is less than or equal to a total number of pixels of the time-of-flight sensor.

6. The method according to claim 5, wherein the first set of pixels comprises at least one second zone of pixels containing a number of pixels that is less than or equal to the total number of pixels of the time-of-flight sensor, the method comprising repeating the determination of the assembly coefficient for the second zone, the resulting scene being obtained by assembling the first corrected data sets and the second data sets of the first and second zones.

7. The method according to claim 3, wherein the assembly coefficient is determined for at least one second set of pixels of the time-of-flight sensor, said pixels not being located in a zone of light saturation of the pixels and having a higher signal-to-noise ratio ranging between a second and a third threshold or for which the first data sets are within a second predetermined confidence interval.

8. The method according to claim 3, wherein the assembly coefficient is determined for each pixel of the time-of-flight sensor.

9. The method according to claim 1, wherein acquiring the first shot of the scene is performed by a first photodiode of each pixel of the time-of-flight sensor and acquiring the second shot of the scene is performed by a second photodiode of each pixel of the time-of-flight sensor, wherein the acquisition of the first and second shots is substantially simultaneous and includes:
    converting a light signal received by the first photodiode of the pixels into a first signal comprising a first data set;
    converting a light signal received by the second photodiode of the pixels into a second signal comprising a second data set; and
    saving, in a memory, the first and second data sets of the pixels that are not located in a zone of light saturation of the pixels and that have a signal-to-noise ratio that is above a threshold or for which data of the first data set is within a predetermined confidence interval, with the pixels for which the first and second data sets are saved forming a first set.

10. The method according to claim 9, wherein assembling the first and second shots of the scene includes:
    determining, for at least the first set of pixels, an assembly coefficient by weighting and averaging the first and second data sets of the pixels of the second set;
    determining a first corrected data set by multiplying the first data set of each pixel of the time-of-flight sensor by the assembly coefficient; and
    adding the first corrected data set and the second data set to obtain the resulting scene, the data generated by each pixel of the second set having a signal-to-noise ratio that is above a threshold, said pixel not being in a zone of light saturation.

11. A device for assembling at least two shots of a scene acquired by a time-of flight sensor, comprising:
    a memory; and
    processing circuitry configured to:
        save, in the memory, a first data set contained in a first signal generated by each pixel of the time-of-flight sensor and indicative of a first shot of the scene acquired by the time-of-flight sensor during a first acquisition time, and a second data set contained in a second signal generated by each pixel of the time-of-flight sensor and indicative of a second shot of the scene acquired by the time-of-flight sensor during a second acquisition time longer than the first acquisition time, wherein
            the first and second data sets of the pixels do not include data from each pixel located in a zone of light saturation; and
            the first and second data sets each having a signal-to-noise ratio that is above a threshold signal-to-noise ratio; and
        assemble the first and second shots on the basis of the content of the first and second data sets of a plurality of pixels in order to form a resulting scene.

12. The device according to claim 11, wherein the processing circuitry is configured to:
    determine a first set of pixels comprising a plurality of pixels that are not in a zone of light saturation of the pixels and for which the first data set is within a predetermined confidence interval;
    save the first data set of each pixel of the first set of pixels in the memory so that the first data set of each pixel of the time-of-flight sensor is addressed according to a position of the pixel in the time-of-flight sensor;
    save the second data set of each pixel of the first set of pixels addressed according to the position of the pixel in the time-of-flight sensor;
    determine an assembly coefficient by weighting and averaging the first and second data sets of the pixels of the first set;
    determine a first corrected data set by multiplying the first data set by the assembly coefficient; and
    add the first corrected data set and the second data set to obtain the resulting scene.

13. The device according to claim 12, wherein the first set of pixels comprises all the pixels of the time-of-flight sensor.

14. The device according to claim 12, wherein the first set of pixels comprises at least one first zone of pixels of the time-of-flight sensor containing a number of pixels that is less than or equal to a total number of pixels of the time-of-flight sensor.

15. The device according to claim 14, wherein the first set of pixels comprises at least one second zone of pixels containing a number of pixels that is less than or equal to the total number of pixels of the time-of-flight sensor, the processing circuitry further configured to repeat the determination of the assembly coefficient for the second zone, the resulting scene being obtained by assembling the first corrected data sets and the second data sets of the first and second zones.

16. The device according to claim 12, wherein the processing circuitry is configured to compute the assembly coefficient for at least one second set of pixels of the time-of-flight sensor, said pixels not being located in a zone of light saturation of the pixels and having a higher signal-to-noise ratio ranging between a second and a third threshold or for which the first data sets are within a second predetermined confidence interval.

17. The device according to claim 12, wherein the processing circuitry is configured to compute the assembly coefficient for each pixel of the time-of-flight sensor.

18. The device according to claim 11, wherein, when each pixel of the time-of-flight sensor comprises a first photodiode and a second photodiode, and the processing circuitry is configured to:
    save the first data sets in the memory for which a signal-to-noise ratio of the first signal of each pixel is above a threshold or for which the first data set of said pixel is within a confidence interval, said pixel not being located in a zone of light saturation of the pixels;
    determine an assembly coefficient by weighting and averaging the first and second data sets of the pixels of the first set;
    determine a first corrected data set by multiplying the first data set by the assembly coefficient; and
    add the first corrected data set and the second data set to obtain the resulting scene.

19. A system for assembling at least two scenes, comprising:
   a time-of-flight sensor; and
   a device communicatively coupled to the time-of-flight sensor, the device including:
      a memory; and
      processing circuitry configured to:
         save, in the memory, a first data set contained in a first signal generated by each pixel of the time-of-flight sensor and indicative of a first shot of the scene acquired by the time-of-flight sensor during a first acquisition time, and a second data set contained in a second signal generated by each pixel of the time-of-flight sensor and indicative of a second shot of the scene acquired by the time-of-flight sensor during a second acquisition time longer than the first acquisition time;
         determine a first set of pixels comprising a plurality of pixels that are not in a zone of light saturation of the pixels and that each generate a first data signal having a signal-to-noise ratio above a threshold signal-to-noise ratio; and
         assemble the first and second shots on the basis of the content of the first and second data sets of a plurality of pixels in order to form a resulting scene.

20. The system according to claim 19, wherein the processing circuitry is configured to:
   save the first data set of each pixel of the first set of pixels in the memory so that the first data set of each pixel of the time-of-flight sensor is addressed according to a position of the pixel in the time-of-flight sensor;
   save the second data set of each pixel of the first set of pixels addressed according to the position of the pixel in the time-of-flight sensor;
   determine an assembly coefficient by weighting and averaging the first and second data sets of the pixels of the first set;
   determine a first corrected data set by multiplying the first data set by the assembly coefficient; and
   add the first corrected data set and the second data set to obtain the resulting scene.

* * * * *